Patented Nov. 6, 1923.

1,473,286

UNITED STATES PATENT OFFICE.

EDWIN B. FORSE, OF PERTH AMBOY, NEW JERSEY, ASSIGNOR TO THE CARBORUNDUM COMPANY, OF NIAGARA FALLS, NEW YORK, A CORPORATION OF PENNSYLVANIA.

REFRACTORY ARTICLE.

No Drawing. Application filed August 24, 1922. Serial No. 584,091.

*To all whom it may concern:*

Be it known that I, EDWIN B. FORSE, a citizen of the Dominion of Canada, and a subject of the King of Great Britain, residing at Perth Amboy, Middlesex County, New Jersey, have invented a new and useful Improvement in Refractory Articles, of which the following is a full, clear, and exact description.

This invention relates to an improvement in the manufacture of refractory articles and especially refers to refractory articles made from silicon carbide.

One of the well known methods of producing silicon carbide refractory forms, such as silicon carbide brick, is to make a mixture of crushed silicon carbide consisting of a mixture of grit sizes running from No. 16 mesh down to the finest powder, together with 8% to 10% of plastic fireclay to act as a binder. This mixture is molded or pressed into the required shape and then fired at a temperature of 1400° C. and upwards. Such articles are highly refractory, mechanically strong and are of a close dense nature resisting fairly well the penetration of gases and slags. In certain locations, however, the small amount of furnace gases which penetrate the pores of the brick has an oxidizing action on the silicon carbide which tends to lower its refractoriness and weaken it mechanically, and also allows some slag penetration.

I have discovered that if, after molding the brick, it is given a thin coating or painting of very finely divided silicon carbide, this paint sinks into and fills up the surface pores and interstices and gives a smooth, highly impervious surface. For this purpose, I preferably take silicon carbide ground to fine powder, consisting mostly of material which will go through a 200 mesh silk. It is, however, possible to use powder of both coarser and finer sizes than this. This powder is then mixed with water and a temporary binder, such as dextrine, flour or other well known binder, to the consistency of paint.

After the silicon carbide article has been molded and dried, this coating of finely divided silicon carbide is put on preferably by painting with a brush. I may also use spraying, dipping or other methods, and may apply the coating before the molded article is dried. I do not aim to get a coating of appreciable thickness, but simply one which will fill the surface pores and promote impermeability. One painting is usually sufficient, although more than one application may be made, if deemed desirable. This coating dries quickly and the article is then burned in the ordinary manner.

During the process of burning, the coating performs a very useful function, as it keeps the oxidizing gases of the kiln from entering the surface layers of the article and thereby oxidizing a portion of the silicon carbide. As this oxidizing would result in lower refractoriness and decreased strength it will be apparent that the coating is highly desirable.

When the articles come from the kiln, the coating has the appearance of an enamel and is very impervious to gases and slags. In some cases, small amounts of impurity present in the silicon carbide or other constituents unite with the paint and make the coating of a more or less glazed character and appearance. This coating not only protects the interior of the brick from oxidizing and other gases during the firing operation, but also from the action of gases which may be present in the furnace after the brick is installed. The coating adheres very firmly to the refractory article and becomes an integral part of the surface. Under alternate heating and cooling, having practically the same coefficient of expansion as the main silicon carbide body, it does not flake off and has great durability.

The coating is of special value in silicon carbide saggers. One of the difficulties met with in firing porcelain in silicon carbide saggers is that the silicon carbide has a chemical action on the porcelain lying close to it resulting in discoloration. The coating prevents this action and also makes the sagger more impervious to the combustion gases from the outside.

This invention may be applied not only to silicon carbide articles, but to other refractories, such as alumina, magnesia, sillimanite, etc., to produce an impervious coating of the same composition and integral with the main body.

While it is preferred to apply the coating containing the finely divided silicon carbide to the green refractory article after it has been dried, the coating may be applied at other times during its process of manufacture. For example, the article might be first heated or burned and then coated, in which case, the article at some subsequent time should be subjected to a temperature sufficient to mature the coating.

Certain advantages of the present invention arise from the provision of a coating for refractory articles, which coating may have characteristics similar to those of the body of the article to increase the bonding action and provide substantially the same coefficient of expansion, whereby the quality of the articles is improved and the length of life and strength greatly increased.

I claim:

1. A refractory article containing silicon carbide grains having its surface pores filled with finely divided silicon carbide.

2. A refractory article containing silicon carbide grains having its surface pores filled with silicon carbide grains in a condition of finer division than the average grain size of the article.

3. A refractory article of silicon carbide having a surface coating of finely divided silicon carbide.

4. A refractory article of silicon carbide containing relatively coarse particles and having a surface coating of finely divided silicon carbide.

5. A refractory article of silicon carbide composed of a main body containing coarse and fine particles and having a surface coating of finely divided silicon carbide.

6. A refractory article of silicon carbide having a painted film of silicon carbide on the surface thereof.

7. A fired refractory article containing a mixture of grit sizes of silicon carbide ranging from No. 16 mesh down to the finest powder, 8% to 10% of fire clay, and having its surface pores filled with finely divided silicon carbide and a binder.

In testimony whereof I have hereunto set my hand.

EDWIN B. FORSE.